(12) United States Patent
Poivet et al.

(10) Patent No.: US 8,535,798 B2
(45) Date of Patent: Sep. 17, 2013

(54) PRESSURE-SENSITIVE ADHESIVES HAVING A TEMPERATURE-STABLE ADHESIVE POWER

(75) Inventors: Sylwia Poivet, Paris (FR); David Goubard, Compiegne (FR)

(73) Assignee: Bostik SA, Courvevoie (FR)

( * ) Notice: Subject to any disclaimer, the term of this patent is extended or adjusted under 35 U.S.C. 154(b) by 280 days.

(21) Appl. No.: 12/808,753

(22) PCT Filed: Dec. 15, 2008

(86) PCT No.: PCT/FR2008/001734
§ 371 (c)(1),
(2), (4) Date: Nov. 1, 2010

(87) PCT Pub. No.: WO2009/106699
PCT Pub. Date: Sep. 3, 2009

(65) Prior Publication Data
US 2011/0052912 A1 Mar. 3, 2011

(30) Foreign Application Priority Data

Dec. 21, 2007 (FR) ..................... 07 09027

(51) Int. Cl.
*B32B 7/12* (2006.01)
*B05D 5/10* (2006.01)
*C08F 8/30* (2006.01)
*C08F 283/08* (2006.01)
*C08F 283/12* (2006.01)

(52) U.S. Cl.
USPC .............. 428/355 N; 428/347; 428/423.1; 427/207.1; 427/208.4; 526/931; 525/102; 525/455

(58) Field of Classification Search
USPC .......... 428/355 N, 423.1, 347; 427/207.1, 427/208.4; 525/102, 455; 524/266; 526/931
See application file for complete search history.

(56) References Cited

U.S. PATENT DOCUMENTS

| 5,990,257 | A | 11/1999 | Johnston et al. |
| 2004/0180155 | A1 | 9/2004 | Nguyen-Misra et al. |
| 2007/0167584 | A1* | 7/2007 | Fujimoto et al. ............. 525/474 |
| 2011/0151253 | A1* | 6/2011 | Laferte et al. .......... 428/355 CN |

FOREIGN PATENT DOCUMENTS

| EP | 0 931 800 A1 | 7/1999 |
| EP | 1 715 015 A1 | 10/2006 |
| WO | WO 98/30648 A1 | 7/1998 |

OTHER PUBLICATIONS

International Search Report of PCT/FR2008/001734 (Aug. 28, 2009).

\* cited by examiner

*Primary Examiner* — Thao T. Tran
(74) *Attorney, Agent, or Firm* — Millen, White, Zelano & Branigan, P.C.

(57) ABSTRACT

The invention relates to an adhesive composition that can be cross-linked by heating, said composition comprising between 20 and 85% of a polyurethane comprising 2 terminal groups of the hydrolysable alkoxysilane type of formula (I): wherein: $R^1$ is a hydrocarbonated radical comprising between 5 and 15 carbon atoms; $R^2$ is an alkylene radical comprising between 1 and 4 carbon atoms; $R^3$ is an alkylene radical comprising between 1 and 3 carbon atoms; $R^4$ and $R^5$ are each an alkyl radical comprising between 1 and 4 carbon atoms; n is a whole number such that the average molar mass of the polyether block of formula —$[OR^2]n$- is between 300 Da and 30 kDa; in is a whole number such that the average molar mass of the polymer of formula (I) is between 600 Da and 60 kDa; and p is a whole number equal to 0, 1 or 2. The composition also comprises between 15 and 80% of a compatible tackifying resin; and between 0.01 and 3% of a cross-linking catalyst. The invention also relates to a self-adhesive carrier coated with the cross-linked adhesive composition.

(I)

$$(R^5O)_{3-p}(R^4)_p Si-R^3-NH-\underset{\underset{O}{\|}}{C}\Big(OR^2\Big)_n\Big[O-\underset{\underset{O}{\|}}{C}-NH-R^1-$$

$$-NH-\underset{\underset{O}{\|}}{C}\Big(OR^2\Big)_n\Big]_m O-\underset{\underset{O}{\|}}{C}-NH-R^3-Si(R^4)_p(OR^5)_{3-p}$$

14 Claims, No Drawings

PRESSURE-SENSITIVE ADHESIVES HAVING A TEMPERATURE-STABLE ADHESIVE POWER

One subject of the present invention is an adhesive composition heat-curable, and a self-adhesive support coated with a pressure-sensitive adhesive consisting of said cured composition. Said self-adhesive support is used for manufacturing self-adhesive labels and/or tapes and advantageously has an adhesive strength which may be maintained over a wide temperature range.

Pressure-sensitive adhesives or PSAs are substances that give the support coated therewith an immediate tack at room temperature, which allows its instantaneous adhesion to a substrate under the effect of brief slight pressure. PSAs are widely used for the manufacture of self-adhesive labels which are fastened to articles for the purpose of presenting information (such as a bar code, description, price) and/or for decorative purposes. PSAs are also used for the manufacture of self-adhesive tapes of various uses. Mention may be made, for example, besides the transparent adhesive tape widely used in daily life, of: the forming and assembling of cardboard packaging; the protection of surfaces for painting works, in construction; holding electrical cables in the transport industry; the bonding of carpets by double-sided adhesive tapes.

With a view to the manufacture of self-adhesive labels and/or tapes, PSAs are generally applied by continuous coating processes to the entire surface of a (where appropriate printable) support layer of large dimensions, in an amount (generally expressed in g/m$^2$) and denoted hereinbelow by the term "weight per unit area". The support layer is constituted of paper or a film of polymer material having one or more layers. The adhesive layer that covers the support layer may itself be covered with a protective non-stick layer (often called a "release liner"), for example composed of a siliconized film. The multilayer system obtained is generally packaged by being wound up in the form of large reels up to 2 m in width and 1 m in diameter, which can be stored and transported.

These multilayer systems may subsequently be converted to self-adhesive labels that can be applied by the end users by means of conversion processes that include the printing of desired decorative elements and/or information on the printable side of the support layer, followed by cutting to the desired shape and dimensions. The protective non-stick layer may be easily removed without modifying the adhesive layer that remains fastened to the support layer. After separation from its protective non-stick layer, the label is applied to the article to be coated either manually, or with the use of labelers on automated packaging lines.

These multilayer systems may also be converted to self-adhesive tapes by cutting and packaging as rolls of predetermined width and length.

PSAs, because of their high room-temperature tack, make it possible for the self-adhesive label and/or tape to be rapidly bonded to the substrate (or article) to be coated (for example, regarding labels, onto bottles or else, regarding tapes, onto packing boxes to be formed), suitable for obtaining high industrial production rates.

There is a field of application of PSAs for which it is desirable for the adhesive strength of the labels and/or tapes on the substrate to also be maintained when the adhesive joint that provides the fastening is exposed (and also, therefore, the article coated with the label and/or tape) at a temperature capable of varying over a wide range. Mention may be made, by way of example, of the laying of stickers on certain components of motor vehicles (or other vehicles) located in the vicinity of the engine, or on packaging designed to receive a hot liquid during the packaging thereof, or else on articles (such as tires) which are labeled when hot, at the end of production lines. Mention may also be made of the use of self-adhesive tapes for the assembly of parts for which a good thermal resistance is necessary such as in the case, for example, of the interior trim of aircraft or other vehicles.

PSAs often used for this field of application include polymers (or copolymers) of acrylate type of very high molecular weight. The latter are in the form either of an aqueous emulsion or of an organic solution. However, the coating of such PSAs on a support layer is complicated, from an industrial point of view, by the fact that it is necessary to provide either a supplementary step of drying the emulsion, or particular installations that take into account the industrial safety and health problems linked to the evaporation of the organic solvent. In both cases, the drawbacks linked to the unpleasant odor of the acrylics must also be taken into account.

PSAs are known that do not comprise either solvent or water. Thus, hot-melt pressure-sensitive adhesives or HMPSAs are substances that are solid at room temperature, which are deposited (or coated) on the support in the melt state, and give the latter, after cooling, high tack and adhesive strength on various substrates. However, the corresponding compositions generally comprise a thermoplastic polymer, so that the adhesive joint providing the attachment of the support to the substrate does not have, at high temperature, all the cohesion needed for the field of application targeted previously.

U.S. Pat. No. 6,486,229 describes a UV curable hot-melt adhesive composition comprising a tackifying resin, a photoinitiator and a radial multiblock styrene-butadiene copolymer, the butadiene block of which has a high content of pendant vinyl groups. This composition is coated in the uncured state onto a support layer, then cured by exposure to ultraviolet radiation. The self-adhesive support thus obtained is particularly suitable for tape and label applications for which good cohesion at high temperature is required. International application WO 2004/011559 describes an acrylic composition capable of being coated that comprises an acrylic copolymer, a photoinitiator and a multifunctional (meth)acrylate. This composition may also be cured by exposure to ultraviolet radiation in order to give a high-performance PSA.

These techniques for obtaining PSAs have, however, drawbacks which result from the industrial health problems linked to the UV lamps and from the costs associated with the short working life of these lamps. Furthermore, in the case of self-adhesive supports having a high weight per unit area of PSA, for example a weight per unit area greater than 70 g/m$^2$, it is difficult to ensure the adhesive strength is maintained over a wide temperature range, and especially at high temperature.

Patent application EP 0106330 describes a composition which offers, in particular, good heat resistance and tack properties, and which comprises a tackifying resin and a polyether having a silyl hydrolysable end group. This application also describes the production of a pressure-sensitive adhesive product by depositing, onto a support, said composition in which a catalyst has been incorporated, then curing at a temperature that varies between room temperature and 150° C. Patent application CA 2554743 teaches a composition which comprises a tackifying resin, a catalyst and an oxyalkylene polymer containing from 0.3 to 0.7 equivalents of hydrolysable silyl groups in each molecule of molecular weight between 15 000 and 100 000. Said composition is applied to a support by means of a coater and cured at high temperature to give a self-adhesive product.

The self-adhesive products described by the latter 2 applications have however the drawback that, at temperature, the maintenance of their adhesive strength on a substrate is insufficient for high weights per unit area.

The objective of the present invention is to provide a heat-curable adhesive composition which results, after coating on a support then curing, in a pressure-sensitive adhesive that has improved adhesive strength and tack properties. Another objective of the invention is that the adhesive joint providing the attachment of the self-adhesive support thus obtained to a substrate retains the required cohesion over a wide temperature range, including for high weights per unit area of PSA.

A first subject of the present invention is therefore a heat-curable adhesive composition comprising:

from 20 to 85% of a polyurethane comprising 2 hydrolysable alkoxysilane type end groups and having the formula (I):

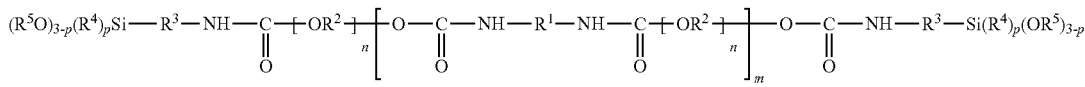

in which:

$R^1$ represents a hydrocarbon-based divalent radical comprising from 5 to 15 carbon atoms which may be aromatic or aliphatic, linear, branched or cyclic;

$R^2$ represents a linear or branched alkylene divalent radical comprising from 1 to 4 carbon atoms;

$R^3$ represents a linear alkylene divalent radical comprising from 1 to 3 carbon atoms;

$R^4$ and $R^5$, which are identical or different, each represent a linear or branched alkyl radical having 1 to 4 carbon atoms, with the possibility, when there are several $R^4$ (or $R^5$) radicals, that these are identical or different;

n is an integer such that the number-average molecular weight of the polyether block of formula $-[OR^2]_n-$ is between 300 Da and 30 kDa;

m is an integer such that the number-average molecular weight of the polymer of formula (I) is between 600 Da and 60 kDa;

p is an integer equal to 0, 1 or 2;

from 15 to 80% of a compatible tackifying resin, having a number-average molecular weight between 200 Da and 5 kDa, chosen from the resins capable of being obtained:

(i) by polymerization of terpene hydrocarbons and of phenols, in the presence of Friedel-Crafts catalysts; or else
(ii) by polymerization of α-methylstyrene, and optionally by reaction with phenols; and from 0.01 to 3% of a curing catalyst.

In the present text and in the absence of contrary indication:
the amounts expressed in the form of a percentage correspond to weight/weight percentages;
the $R^1$ to $R^5$ radicals and also the integers n, m and p retain the same meaning as that defined above in the various chemical formulae;
the number-average and weight-average molecular weights are expressed in daltons (Da) and are determined by gel permeation chromatography, the column being calibrated with polyethylene glycol (PEG) standards.

The polymer of formula (I) included in the composition according to the invention may be obtained according to the following process.

In a first step, a polyurethane comprising two hydroxyl end groups and having the formula (II):

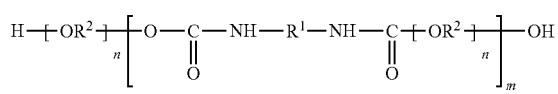

is prepared by reacting one mole of diisocyanate of formula (III):

with around two moles of a polyether diol of formula (IV):

which corresponds to a ratio of the numbers of NCO/OH functional groups equal to around 0.5.

The reaction takes place at a temperature between 60 and 90° C., over a time of around 2 to 8 hours and optionally in the presence of a catalyst.

The polyurethane of formula (II) is, in a second step, converted to polyurethane of formula (I) by a silylation reaction with an isocyanatosilane of formula (V):

in an amount of around one mole of polyurethane of formula (II) per two moles of compound of formula (V).

Polyether diols of formula (IV) are widely commercially available, and isocyanatosilanes of formula (V) are too. Mention may be made, by way of example, of γ-isocyanato-n-propyltrimethoxysilane which is available under the name Geniosil® GF 40 or else α-isocyanato-n-methyl(methyl)dimethoxysilane which is available under the trade name Geniosil® XL 42, both from Wacker.

The two syntheses steps are carried out under anhydrous conditions, so as to avoid hydrolysis of the alkoxysilane groups. A typical temperature range for carrying out these reactions is from 30° to 120° C., and more particularly from 60 to 90° C. A slight variation with respect to the stoichiometries given previously may be envisaged without any drawback, provided, however, that 10% is not exceeded in the first step (synthesis of the polyurethane of formula II) and 2% is not exceeded in the second step (synthesis of the polyurethane of formula I).

Reference is made to European patent EP 0 931 800 for further details concerning the preparation of the polyurethane of formula (I) having alkoxysilane type end groups.

The number-average molecular weight of the polyurethane of formula (I) is between 600 Da and 60 kDa, which corresponds to a value of m which varies from around 1 to 10.

According to one preferred variant of the composition according to the invention, the polyurethane of formula (I) is such that its number-average molecular weight is between 4 and 50 kDa (which corresponds substantially to a value of m that varies from 1 to 4), and the number-average molecular weight of the polyether block of formula $-[OR^2]_n-$ is between 2 and 25 kDa.

According to another preferred variant, optionally taken in combination with the preceding variant, the polyurethane of formula (I) is such that:

$R^1$ is chosen from one of the following divalent radicals, the formulae of which below show the 2 free valences:
a) the divalent radical derived from isophorone:

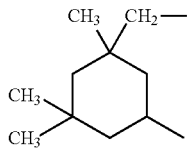

b)

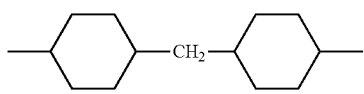

c)

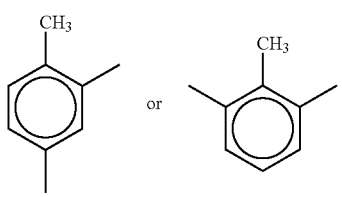

d)

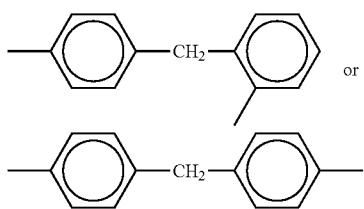

e)
—$(CH_2)_6$— (or hexamethylene radical);
$R^2$ is the ethylene and/or isopropylene divalent radical;
$R^3$ is the methylene and/or n-propylene divalent radical; and
$R^4$ and $R^5$ each represent the methyl or ethyl radical.

According to one more particularly preferred variant of the composition according to the invention, the polyurethane of formula (I) is such that:
$R^1$ is the divalent radical of formula:

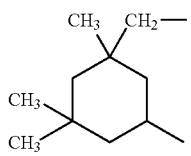

that is derived from isophorone; and
$R^2$ is the isopropylene divalent radical;
$R^3$ is the n-propylene divalent radical; and
the —$Si(R^4)_p(OR^5)_{3-p}$ group is the trimethoxysilyl radical.

According to one also advantageous variant of the PSA according to the invention, the polyurethane of formula (I) has a polydispersity index between 1.1 and 2.0. The polydispersity index is the ratio of the weight-average molecular weight to the number-average molecular weight. Such a polyurethane may be prepared from a polyether diol of formula (IV) itself having a polydispersity index between 1 and 1.6. Such a polyether may be obtained, in a known manner, by polymerization of the corresponding alkylene oxide in the presence of a catalyst based on a double metal-cyanide complex.

When $R^2$ is the isopropylene radical, the polyurethane of formula (I) advantageously has a polydispersity index between 1.3 and 1.6. Such a polyurethane may be prepared from a polyisopropoxy diol (also known as polypropylene glycol or polyoxyisopropylene diol), the polydispersity index of which may vary from 1 to 1.4. Such polypropylene glycols are commercially available. Mention may be made, as examples, of the polypropylene glycols having a polydispersity index of around 1.1, which are available under the trade mark ACCLAIM® from Bayer, such as ACCLAIM® 8200 having a number-average molecular weight of around 8250 Da, ACCLAIM® 12200 having a number-average molecular weight of 11225 Da and ACCLAIM® 18200 having a number-average molecular weight of 18100 Da.

As regards the tackifying resins which may be included in the composition according to the invention, the expression "compatible tackifying resin" is understood to mean a tackifying resin which, when it is mixed in 50%/50% proportions with the polymer of formula (I), gives a substantially homogeneous blend. Such resins are commercially available and among those capable of being obtained by the processes (i) and (ii) defined above, mention may be made of the following products:

process (i): Dertophene® 1510 available from DRT that has a molecular weight $M_n$ of around 870 Da; Dertophene® H150 available from the same company with a molecular weight $M_n$ equal to around 630 Da; Sylvarez® TP 95 available from Arizona Chemical having a molecular weight $M_n$ of around 1200 Da;

process (ii): Norsolene® W100 available from Cray Valley, which is obtained by polymerization of α-methylstyrene without the action of phenols, with a number-average molecular weight of 900 Da; Sylvarez® 510 which is also available from Arizona Chemical with a molecular weight $M_n$ of around 1740 Da, the production process of which comprises the action of phenols.

In accordance with one preferred variant of the heat-curable adhesive composition according to the invention, the tackifying resins used are capable of being obtained by the process (i) as defined above.

The curing catalyst that can be used in the composition according to the invention may be any catalyst known to a person skilled in the art for silanol condensation. Mention may be made, as examples of such catalyst, of organic derivatives of titanium such as titanium acetyl acetonate (commercially available under the name TYZOR® AA75 from DuPont), of aluminum such as aluminum chelate (commercially available under the name K-KAT® 5218 from King Industries), amines such as 1,8-diazobicyclo[5.4.0]undec-7-ene or DBU.

According to one preferred variant, the heat-curable adhesive composition comprises from 40 to 65% of the polyurethane of formula (I) and 35 to 60% of tackifying resin.

Optionally, the composition according to the invention may also include, in combination with the polyurethane having hydrolysable end groups of formula (I), thermoplastic polymers often used in the preparation of HMPSAs, such as ethylene/vinyl acetate (EVA) or styrene block copolymers.

The heat-curable adhesive composition according to the invention may also comprise, besides a tackifying resin capable of being obtained by the process (i) or (ii), other tackifying resins having a number-average molecular weight between 200 and 5000 Da which may also be incorporated in isolation or as a mixture. Among the resins that can be envisaged, mention may be made of (iii) natural or modified rosins, such as for example the rosin extracted from pine gum, wood rosin extracted from tree roots and their derivatives that are hydrogenated, dimerized, polymerized or esterified by monoalcohols or polyols such as glycerol;

(iv) resins obtained by hydrogenation, polymerization or copolymerization (with an aromatic hydrocarbon) of mixtures of unsaturated aliphatic hydrocarbons having around 5, 9 or 10 carbon atoms derived from petroleum fractions;

(v) terpene resins generally resulting from the polymerization of terpene hydrocarbons such as, for example, monoterpene (or pinene) in the presence of Friedel-Crafts catalysts;

(vi) copolymers based on natural terpenes, for example styrene/terpene, α-methylstyrene/terpene and vinyltoluene/terpene; and (vii) acrylic resins.

The content of such resins in the composition according to the invention should not however exceed 40% of the total weight of tackifying resins present in the composition.

The heat-curable adhesive composition according to the invention may also comprise up to 3% of a hydrolysable alkoxysilane derivative, as a desiccant, and preferably a trimethoxysilane derivative. Such an agent advantageously prolongs the shelf life of the composition according to the invention during storage and transport, before the use thereof. Mention may be made, for example, of γ-methacryloxypropyltrimethoxysilane available under the trade name SILQUEST® A-174 from US Momentive Performance Materials Inc.

The composition according to the invention may also include a plasticizer such as a phthalate or a benzoate, a paraffinic and naphthenic oil (such as Primol® 352 from ESSO) or else a wax of a polyethylene homopolymer (such as A-C® 617 from Honeywell) or a wax of a polyethylene/vinyl acetate copolymer, or else pigments, dyes or fillers.

Finally, an amount of 0.1 to 2% of one or more stabilizers (or antioxidants) is preferably included in the composition according to the invention. These compounds are introduced to protect the composition from degradation resulting from a reaction with oxygen which is capable of forming by action of heat or light. These compounds may include primary antioxidants that trap the free radicals and are especially substituted phenols such as Irganox® 1076 from CIBA. Primary antioxidants may be used alone or in combination with other secondary antioxidants or UV stabilizers.

The heat-curable adhesive composition according to the invention may be prepared by a process which comprises:

a step of mixing in an air-free environment, preferably under an inert atmosphere, the polymer of formula (I) with the tackifying resin(s), at a temperature between 50 and 170° C., preferably between 100 and 170° C.; then a step of cooling said mixture to a temperature ranging from 50 to 90° C., and advantageously of around 70° C.; then a step of incorporating into said mixture catalyst and, where appropriate, desiccant and other optional components.

Another subject of the present invention is a self-adhesive support capable of being obtained by the process comprising:

(a) preheating the adhesive composition as defined previously at a temperature between 50 and 130° C.; then (b) coating it onto a support layer; then (c) curing it, by heating the thus coated support at a temperature between 50 and 150° C.

The step (b) of coating the support layer is carried out using known coating devices, such as for example a lipped die or a curtain-coating type die, or else a roll. It uses a weight per unit area of adhesive composition ranging from 3 to 500 g/m$^2$, preferably from 10 to 250 g/m$^2$. The material that can be used for the support layer is, for example, paper or a film of polymer material having one or more layers.

The time needed for the curing of step (c) may vary to a large extent, for example between 1 second and 10 minutes.

This heat-curing step has the effect of creating, between the polymer chains of the polyurethane of formula (I) and under the action of atmospheric moisture—siloxane-type bonds which result in the formation of a three-dimensional polymer network. The thus cured adhesive composition is a pressure-sensitive adhesive which gives the support layer that is coated therewith desirable adhesive strength and tack.

Thus, a polyethylene terephthalate (PET) support coated with a weight per unit area of 20 g/m$^2$ has permanent adhesion to a stainless steel substrate corresponding to an adhesive strength (measured by the 180° peel test on stainless steel described below) that is advantageously between 1 and 15 N/cm, preferably between 2 and 10 N/cm. The tack of the same support at room temperature (measured by the loop tack test described below) is advantageously between 0.5 and 8, preferably between 2 and 6 N/cm$^2$.

Similarly, a polyethylene terephthalate (PET) support coated with a weight per unit area of 200 g/m$^2$ has permanent adhesion to a stainless steel substrate corresponding to an adhesive strength advantageously between 1 and 50 N/cm, preferably between 5 and 30 N/cm. The tack of this same support at room temperature is advantageously between 1 and 30 N/cm$^2$, preferably between 4 and 15 N/cm$^2$.

Finally, the adhesive joint formed after application onto a substrate of the support layer coated with the cured composition ensures the attachment of said support layer in a temperature range that extends from −60° C. to +200° C.

The self-adhesive support according to the invention may also comprise a protective non-stick layer that covers the PSA layer, said protective layer being simply laminated.

The present invention also relates to the use of the self-adhesive support defined previously for the manufacture of self-adhesive labels and/or tapes.

The weight per unit area of heat-curable adhesive composition necessary for the manufacture of self-adhesive labels may range from 10 to 100 g/m$^2$, preferably from 20 to 50 g/m$^2$. That needed for the manufacture of self-adhesive tapes may vary over a much wider range extending from 3 to 500 g/m$^2$, preferably from 15 to 250 g/m$^2$.

The following examples are given purely by way of illustration of the invention and should not be interpreted as limiting the scope thereof.

Examples A to C illustrate the preparation of polyurethanes of formula (I) in which the 2 alkoxysilane-type end groups are constituted by the trimethoxysilyl radical, R$^2$ is the isopropylene radical and R$^3$ is the n-propylene radical.

Example A: preparation of the polyurethane A of formula (I) in which the polyether block of formula —[OR$^2$]$_n$— has a molecular weight of around 8250 Da:

Introduced into a glass reactor are:
- 961.2 g (0.1165 mol) of the polyisopropoxy diol ACCLAIM® 8200,
- 12.99 g (0.0582 mol) of isophorone diisocyanate (IPDI), which corresponds to a ratio of the numbers of NCO/OH functional groups equal to 0.5; and:
- 120 ppm of a catalyst of bismuth/zinc neodecanoate type (commercially available from Borchers, under the name Borchi Kat VP 0244).

This mixture is kept under constant stirring at 85° C. and under nitrogen for 3 hours, until complete reaction of the NCO functional groups of the IPDI.

Added next to the hydroxyl-terminated polyurethane thus obtained are 24.6 g (0.1165 mol) of γ-isocyanato-n-propyltrimethoxysilane and the mixture is kept at 85° C. until complete disappearance of the NCO functional groups.

The polyurethane A obtained has a viscosity of 55 Pa·s (measured using a Brookfield viscometer at 23° C., with a No. 7 spindle turning at a rate of 20 rpm), a number-average molecular weight of around 20 kDa and a polydispersity index of around 1.3.

Example B: preparation of the polyurethane B of formula (I) in which the polyether block of formula —[OR$^2$]$_n$— has a molecular weight of around 11225 Da:

Example A is repeated by introducing into the glass reactor 1100 g (0.098 mol) of the polyisopropoxy diol ACCLAIM® 12200 and 10.9 g (0.049 mol) of IPDI, which also corresponds to a ratio of the numbers of NCO/OH functional groups equal to 0.5, and by adding to the hydroxyl-terminated polyurethane obtained 20.7 g (0.098 mol) of the γ-isocyanato-n-propyltrimethoxysilane.

The polyurethane B obtained has a viscosity of 185 Pa·s (measured under the same conditions), a number-average molecular weight of around 30 kDa and a polydispersity index of around 1.4.

Example C: preparation of the polyurethane C of formula (I) in which the polyether block of formula —[OR$^2$]$_n$— has a molecular weight of around 18100 Da:

Example A is repeated by introducing into the glass reactor 1220 g (0.0685 mol) of the polyisopropoxy diol ACCLAIM® 18200 and 7.03 g (0.0342 mol) of IPDI, which also corresponds to a ratio of the numbers of NCO/OH functional groups equal to 0.5, and by adding to the hydroxyl-terminated polyurethane obtained 14.45 g (0.0685 mol) of the γ-isocyanato-n-propyltrimethoxysilane.

The polyurethane C obtained has a viscosity of 390 Pa·s (measured under the same conditions), a number-average molecular weight of around 40 kDa and a polydispersity index of around 1.5.

EXAMPLE 1

1) Preparation of a Heat-Curable Adhesive Composition Based on Polyurethane A The composition that appears in the table below is prepared by firstly introducing the tackifying resin (Dertophene® 1510) into a glass reactor under vacuum and heated at around 160° C. Then, once the resin is thoroughly molten, the polyurethane A is added. The mixture is stirred under vacuum for 15 minutes, then cooled to 70° C. The desiccant (SILQUEST® A-174) and the catalyst (K-KAT® 5218) are then introduced. The mixture is kept under vacuum and continues to be stirred for another 10 minutes.

The viscosity of the mixture is determined at 100° C., using a Brookfield viscometer (equipped with the Thermosel system intended for high-temperature viscosity measurements) provided with an A29 spindle turning at 10 rpm.

The result, expressed in Pa·s, is indicated in the table.

2) Preparation of 2 Pet Support Layers Coated with the Cured Composition, with 2 Weights Per Unit Area Equal to 20 and 200 g/m$^2$ As the support layer, use is made of a rectangular sheet of polyethylene terephthalate (PET) having a thickness of 50 μm and dimensions of 20 cm by 40 cm.

The composition obtained in 1) is preheated to a temperature close to 100° C. and introduced into a cartridge from which a bead is extruded which is deposited close to the edge of the sheet parallel to its width.

The composition enclosed in this bead is then spread over the entire surface of the sheet, so as to obtain a uniform layer of substantially constant thickness. In order to do this a film spreader (also known as a film applicator) is used, which is moved from the edge of the sheet to the opposite edge. A layer of composition is thus deposited that corresponds to a weight per unit area of 20 g/m$^2$, which represents approximately a thickness of the order of 20 μm.

The operation is repeated with a new PET support layer so as to deposit on the latter a layer of composition corresponding to a weight per unit area of 200 g/m$^2$, which represents approximately a thickness of the order of 200 μm.

The 2 PET sheets thus coated are then placed in an oven at 130° C. for 5 minutes for the curing of the composition.

Each of the 2 sheets is then laminated to a protective non-stick layer consisting of a sheet of siliconized film that is rectangular and has the same dimensions.

The 2 PET support layers thus obtained are subjected to the tests described below.

180° Peel Test on a Stainless Steel Plate:

The adhesive strength is evaluated by the 180° peel test on a stainless steel plate as described in FINAT method No. 1 published in the FINAT Technical Manual, 6$^{th}$ edition, 2001. FINAT is the International Federation for Self-adhesive Label Manufacturers and Converters. The principle of this test is the following:

A test specimen in the form of a rectangular strip (25 mm×175 mm) is cut from the PET support layer coated with the cured composition obtained previously. This test specimen is fastened over ⅔ of its length (after removal of the corresponding portion of protective non-stick layer), to a substrate constituted of a stainless steel plate. The assembly obtained is left for 20 minutes at room temperature. It is then placed in a tensile testing machine capable, starting from the end of the rectangular strip that is left free, of peeling or debonding the strip at an angle of 180° and with a separation rate of 300 mm per minute. The machine measures the force required to debond the strip under these conditions.

The results corresponding to the 2 weights per unit area, 20 and 200 g/m$^2$, are expressed in N/cm and are indicated in the table below.

Tack Test (Also Known as Loop Test):

The tack is evaluated by the loop tack test described in FINAT method No. 9, the principle of which is the following.

A test specimen in the form of a rectangular strip (25 mm×175 mm) is cut from the PET support layer coated with the cured composition obtained previously. After removing all of the protective non-stick layer, the 2 ends of this strip are joined so as to form a loop, the adhesive layer of which is facing outward. The 2 joined ends are placed in the movable jaw of a tensile testing machine capable of imposing a rate of displacement of 300 mm/minute along a vertical axis with the possibility of forming a forward-and-back movement. The lower part of the loop placed in the vertical position is firstly put into contact with a horizontal glass plate measuring 25 mm by 30 mm over a square area measuring around 25 mm per side. Once this contact has occurred, the displacement direction of the jaw is reversed. The tack is the maximum value of the force needed for the loop to be completely debonded from the plate.

The results corresponding to the 2 weights per unit area of 20 and 200 g/m², are expressed in N/cm² and are indicated in the table below.

Resistance Time of the Adhesive Joint to Static Shear at 90° C.:

The high-temperature stability of the adhesive strength of the PET support layer obtained previously is evaluated by a test which determines the resistance time of the adhesive joint to static shear at 90° C. Reference is made, for this test, to the FINAT method No. 8. The principle is the following:

A test specimen in the form of a rectangular strip (25 mm×75 mm) is cut from each of the 2 preceding PET support layers. After removal of all of the protective non-stick layer, a square portion of 25 mm per side located at the end of the adhesive strip is fastened to a glass plate.

The test plate thus obtained is introduced, by means of a suitable support, in a substantially vertical position in an oven at 90° C., the non-bonded part of the strip having a length of 50 mm is located underneath the plate. After reaching thermal equilibrium, the part of the strip left free is connected to a weight of 1 kg, the whole of the device always remaining, throughout the duration of the test, kept in the oven at 90° C.

Under the effect of this weight, the adhesive joint which ensures the fastening of the strip to the plate is subjected to a shear stress. To better control this stress, the test plate is in fact placed so as to make an angle of 2° relative to the vertical.

The time is noted at the end of which the strip detaches from the plate following rupture of the adhesive joint under the effect of this stress.

For the 2 weights per unit area of 20 and 200 g/m², this time is greater than the 24 hour duration of the test.

Temperature Leading to Rupture of the Adhesive Joint During Static Shear:

The temperature stability of the adhesive strength of the PET support layer obtained previously is additionally evaluated by the test for determining the temperature that leads to rupture of the adhesive joint during static shear. This test is also known under the name shear adhesion failure temperature (SAFT).

The operations described in the preceding test are repeated, except that an oven is used for which the initial temperature is 20° C. both for the initial thermal equilibrium of the test plate, and also for the whole of the device with the weight of 1 kg. This oven is subjected to a temperature rise programmed at a rate of 1.6° C. per minute.

The temperature at which the strip detaches from the plate following the rupture of the adhesive joint under the effect of this stress is noted.

For the 2 weights per unit area of 20 and 200 g/m², this temperature is greater than 180° C.

EXAMPLES 2 TO 8

Example 1 is repeated with the compositions indicated in the table below.

The same results are obtained, regarding the resistance time of the adhesive joint to static shear at 90° C. and the temperature leading to rupture of the adhesive joint during static shear.

The results of the 180° peel test on a stainless steel plate and of the tack test are also indicated in the table, except for certain values that were not determined (indicated by nd).

| Ingredient | | Example 1 | Example 2 | Example 3 | Example 4 | Example 5 | Example 6 | Example 7 | Example 8 |
|---|---|---|---|---|---|---|---|---|---|
| Polyurethane A | | 53.7 | 53.7 | 53.7 | 53.7 | — | — | 59.3 | 45 |
| Polyurethane B | | — | — | — | — | 53.7 | — | — | — |
| Polyurethane C | | — | — | — | — | — | 53.7 | — | — |
| Dertophene ® 1510 | | 44.7 | — | — | — | 44.7 | 44.7 | — | — |
| Dertophene ® H150 | | — | 44.7 | — | — | — | — | 39.5 | 54.1 |
| Sylvarez ® TP 95 | | — | — | 44.7 | — | — | — | — | — |
| Sylvarez ® 510 | | — | — | — | 44.7 | — | — | — | — |
| K-KAT ® 5218 | | 1.1 | 1.1 | 1.1 | — | — | — | 1.2 | 0.9 |
| TYZOR ® AA75 | | — | — | — | 1.1 | 1.1 | 1.1 | — | — |
| SILQUEST ® A-174 | | 0.5 | 0.5 | 0.5 | 0.5 | 0.5 | 0.5 | — | — |
| Viscosity at 100° C. (Pa · s) | | 20 | 20 | 5 | 2 | 33 | 86 | 16 | 50 |
| Weight per unit area (g/m²) | 20 180° peel (N/cm) | 9 | 8 | 4.2 | 2.9 | nd | nd | nd | nd |
| | Tack (N/cm²) | 5.8 | 3.9 | 2.4 | 1.9 | nd | nd | nd | nd |
| | 200 180° peel (N/cm) | 18.5 | 16 | 7.2 | 5.4 | 20 | 26 | 8 | 26 |
| | Tack (N/cm²) | 13 | 12.5 | 5.1 | 4.3 | 12.4 | 12.4 | 6.7 | 14.4 |

The invention claimed is:

1. A heat-curable adhesive composition comprising:
   from 20 to 85% of a polyurethane comprising 2 hydrolyzable alkoxysilane end groups and of formula (I):

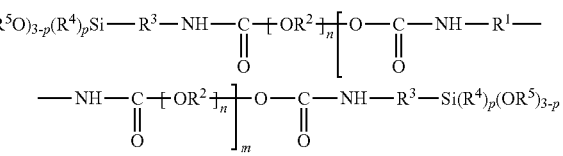

in which:
   R¹ represents a hydrocarbon-based divalent radical comprising from 5 to 15 carbon atoms which may be aromatic or aliphatic, linear, branched or cyclic;
   R² represents a linear or branched alkylene divalent radical comprising from 1 to 4 carbon atoms;

$R^3$ represents a linear alkylene divalent radical comprising from 1 to 3 carbon atoms;

$R^4$ and $R^5$, which are identical or different, each represent a linear or branched alkyl radical having 1 to 4 carbon atoms, with the possibility, when there are several $R^4$ or $R^5$ radicals, that these are identical or different;

n is an integer such that the number-average molecular weight of the polyether block of formula —$[OR^2]_n$— is between 300 Da and 30 kDa;

m is an integer such that the number-average molecular weight of the polymer of formula (I) is between 600 Da and 60 kDa;

p is an integer equal to 0, 1 or 2;

from 15 to 80% of a compatible tackifying resin, having a number-average molecular weight between 200 Da and 5 kDa, that is a resin obtained:

(i) by polymerization of terpene hydrocarbons and of phenols, in the presence of Friedel-Crafts catalysts; or (ii) by polymerization of α-methylstyrene, and optionally by reaction with phenols; and from 0.01 to 3% of a curing catalyst.

2. The adhesive composition as claimed in claim 1, wherein the polyurethane of formula (I) has a number-average molecular weight between 4 and 50 kDa and the polyether block of formula —$[OR^2]_n$— is has a number-average molecular weight between 2 and 25 kDa.

3. The adhesive composition as claimed claim 1, wherein in the polyurethane of formula (I):

$R^1$ is a divalent radical of the formula:

a) a divalent radical derived from isophorone:

b)
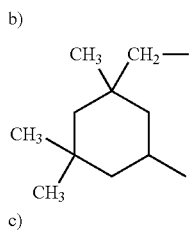

c)
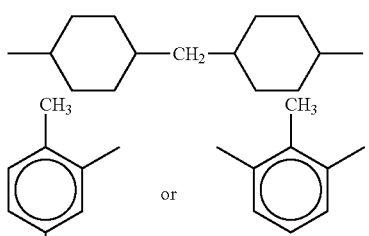
or d)
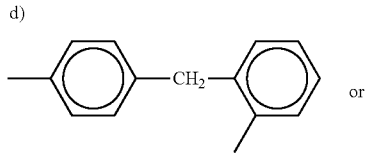
or

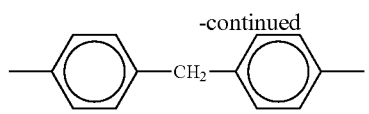

e) a hexamethylene radical —$(CH_2)_6$—;

$R^2$ is an ethylene and/or isopropylene divalent radical;

$R^3$ is a methylene and/or n-propylene divalent radical; and $R^4$ and $R^5$ each represent methyl or ethyl.

4. The adhesive composition as claimed in claim 1, wherein the polyurethane of formula (I):

$R^1$ is a divalent isophorone radical of formula:

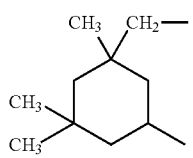

$R^2$ is an isopropylene divalent radical;

$R^3$ is an n-propylene divalent radical; and the —$Si(R^4)_p(OR^5)_{3-p}$ group is a trimethoxysilyl radical.

5. The adhesive composition as claimed in claim 1, in which $R^2$ is an isopropylene radical and, the polyurethane of formula (I) has a polydispersity index between 1.3 and 1.6.

6. The adhesive composition as claimed in claim 1, wherein the tackifying resins used are obtained by the process (i).

7. The adhesive composition as claimed in claim 1, comprising from 40 to 65% of polyurethane of formula (I) and from 35 to 60% of tackifying resin.

8. The adhesive composition as claimed in claim 1, comprising up to 3% of a hydrolysable alkoxysilane derivative, as a desiccant.

9. The adhesive composition according to claim 1, wherein in formula (I), m is 1-10.

10. The adhesive composition according to claim 1, wherein in formula (I), m is 1-4.

11. The adhesive composition according to claim 8, wherein the desicant is a derivative of trimethoxysilane.

12. A self-adhesive label or tape comprising an adhesive according to claim 1.

13. A self-adhesive support obtained by a process comprising:

(a) preheating the adhesive composition as defined in claim 1 at a temperature between 50 and 130° C.; then (b) coating it onto a support layer; then (c) curing it, by heating the thus coated support at a temperature between 50 and 150° C.

14. In a process of converting a self-adhesive support into self-adhesive labels and/or tapes, the improvement wherein said self-adhesive support is a support according to claim 13.

* * * * *

UNITED STATES PATENT AND TRADEMARK OFFICE
CERTIFICATE OF CORRECTION

| | | |
|---|---|---|
| PATENT NO. | : 8,535,798 B2 | Page 1 of 1 |
| APPLICATION NO. | : 12/808753 | |
| DATED | : September 17, 2013 | |
| INVENTOR(S) | : Sylwia Poivet et al. | |

It is certified that error appears in the above-identified patent and that said Letters Patent is hereby corrected as shown below:

Title Page, (57) ABSTRACT, 12$^{th}$ line reads: "30 kDa; in is a whole number such that the average molar" should read --30 kDa; m is a whole number such that the average molar--.

In the Claims:
Column 13, line 25 reads: "block of formula -[OR$^2$]$_n$- is has a number-average" should read --block of formula -[OR$^2$]$_n$- has a number-average--.

Signed and Sealed this
Fourteenth Day of January, 2014

Michelle K. Lee
*Deputy Director of the United States Patent and Trademark Office*